(12) United States Patent
Jones

(10) Patent No.: US 12,268,336 B2
(45) Date of Patent: Apr. 8, 2025

(54) ELEVATED COLANDER

(71) Applicant: Michael A Jones, North Port, FL (US)

(72) Inventor: Michael A Jones, North Port, FL (US)

( * ) Notice: Subject to any disclaimer, the term of this patent is extended or adjusted under 35 U.S.C. 154(b) by 45 days.

(21) Appl. No.: 17/378,763

(22) Filed: Jul. 18, 2021

(65) Prior Publication Data

US 2023/0014423 A1    Jan. 19, 2023

(51) Int. Cl.
*A47J 43/24*        (2006.01)

(52) U.S. Cl.
CPC .................................... *A47J 43/24* (2013.01)

(58) Field of Classification Search
CPC ........................................................ A47J 43/24
See application file for complete search history.

(56) References Cited

U.S. PATENT DOCUMENTS

| | | | | |
|---|---|---|---|---|
| 646,464 | A * | 4/1900 | Schutte ................... | B01D 29/23 |
| 852,233 | A * | 4/1907 | Lyke ........................ | A47J 43/24 |
| | | | | 4/290 |
| 1,016,249 | A * | 2/1912 | Comtois .................. | A47J 43/22 |
| | | | | 210/474 |
| 1,048,546 | A * | 12/1912 | Ketcham ................. | B01D 35/28 |
| | | | | 210/474 |
| 1,247,006 | A * | 11/1917 | Reardon .................. | A47J 47/20 |
| | | | | 4/290 |
| 1,310,773 | A * | 7/1919 | Wills ....................... | A47J 43/22 |
| | | | | 210/474 |
| 1,507,522 | A * | 9/1924 | Simon ...................... | A47J 43/24 |
| | | | | 210/474 |
| 1,621,823 | A * | 3/1927 | Ayres ...................... | A47J 19/005 |
| | | | | 241/73 |
| 1,688,846 | A * | 10/1928 | Andrews ................. | A47J 43/22 |
| | | | | 210/485 |

(Continued)

FOREIGN PATENT DOCUMENTS

| | | | | |
|---|---|---|---|---|
| CN | 108478053 A | | 9/2018 | |
| KR | 2032698 B1 | * | 10/2019 | ............... A47J 43/24 |
| WO | WO-2015162434 A1 | * | 10/2015 | ............... A01G 7/00 |

OTHER PUBLICATIONS

Machine translation of KR102032698 B1 (Year: 2019).*

(Continued)

*Primary Examiner* — Robert J Popovics
(74) *Attorney, Agent, or Firm* — Brent Whitlock Law, LLC; Brent K. Whitlock

(57) ABSTRACT

An elevated colander facilitates separating a mixture of solids and fluid while reducing risk of contamination of the solids from backsplash than traditional methods and devices. The colander may be placed into a larger receptacle (e.g., sink) from which fluid may be disposed, and a mixture of solids and fluids may be poured into the colander to isolate the solids from the fluids. Fluids entering the colander may escape through a plurality of holes in outer walls of the colander and spill into the larger receptacle. A lower ring and bottom surface of the elevated colander below the outer walls may each prevent a measure of backsplash from reentering the colander, thereby minimizing contamination of the solids from the larger receptacle. A support structure extending from the bottom surface may elevate the colander and its contents above pooling fluid accumulating below.

10 Claims, 9 Drawing Sheets

(56) References Cited

U.S. PATENT DOCUMENTS

| | | | | |
|---|---|---|---|---|
| 1,950,378 | A * | 3/1934 | Andrews | A47J 43/22 248/94 |
| 1,975,919 | A * | 10/1934 | Walter | A47J 43/24 D7/672 |
| 2,264,238 | A * | 11/1941 | Burdwood | B07B 1/02 210/495 |
| 2,541,094 | A * | 2/1951 | Pesenti | A47J 36/064 210/239 |
| 2,663,428 | A * | 12/1953 | Hoagland | A47J 43/24 99/485 |
| D199,320 | S * | 10/1964 | Swett | D7/667 |
| 3,170,875 | A * | 2/1965 | Swett | A47J 43/24 210/465 |
| 3,300,048 | A * | 1/1967 | Pollock | A47J 43/24 210/474 |
| D237,032 | S * | 10/1975 | Montes | 210/470 |
| 4,001,904 | A * | 1/1977 | Gill | B67B 7/18 81/3.4 |
| 4,007,751 | A * | 2/1977 | Commiant | A47J 43/24 134/143 |
| D244,827 | S * | 6/1977 | Nevai | D32/55 |
| D246,559 | S * | 12/1977 | Steiner | 210/470 |
| 4,377,191 | A * | 3/1983 | Yamaguchi | B65D 1/14 220/907 |
| D286,490 | S * | 11/1986 | Carlson | D7/667 |
| 4,756,323 | A * | 7/1988 | Horton | A47J 43/24 73/426 |
| D327,608 | S * | 7/1992 | Daenen | D7/667 |
| D334,119 | S * | 3/1993 | Giugiaro | D7/667 |
| D339,506 | S * | 9/1993 | Feer | D7/667 |
| 5,368,170 | A * | 11/1994 | Leis | B07B 1/469 209/420 |
| D353,080 | S * | 12/1994 | Cantereels | D7/698 |
| D358,533 | S * | 5/1995 | Cousins | D7/667 |
| 5,439,128 | A * | 8/1995 | Fishman | B65D 21/086 206/218 |
| 5,501,241 | A * | 3/1996 | Jacobson | F26B 25/063 134/107 |
| D378,565 | S * | 3/1997 | Cousins | D7/667 |
| D378,566 | S * | 3/1997 | Cousins | D7/667 |
| D379,289 | S * | 5/1997 | Jeppesen | D7/667 |
| D390,757 | S * | 2/1998 | Wold | D7/667 |
| D392,847 | S * | 3/1998 | Patel | D7/667 |
| D400,765 | S * | 11/1998 | Cohen | D7/667 |
| D403,210 | S * | 12/1998 | Licari | D7/667 |
| 5,853,581 | A * | 12/1998 | Rayborn | A47J 43/24 210/474 |
| D406,215 | S * | 3/1999 | Patel | D7/667 |
| D409,053 | S * | 5/1999 | Wong | D7/667 |
| 5,931,333 | A * | 8/1999 | Woodnorth | A47J 43/24 220/DIG. 27 |
| 5,992,676 | A * | 11/1999 | Tsai | A47G 19/02 220/629 |
| D419,036 | S * | 1/2000 | Kwong | D7/667 |
| 6,039,887 | A * | 3/2000 | Licari | A47J 47/20 210/473 |
| D425,378 | S * | 5/2000 | Gilbertson | D7/667 |
| D432,368 | S * | 10/2000 | Kaposi | D7/667 |
| D433,884 | S * | 11/2000 | Fujimoto | D7/667 |
| 6,202,542 | B1 * | 3/2001 | Melton | B65D 47/0842 99/279 |
| D440,127 | S * | 4/2001 | Young | D7/667 |
| D463,719 | S * | 10/2002 | Epstein | D7/667 |
| D469,667 | S * | 2/2003 | Burton | D7/667 |
| D498,648 | S * | 11/2004 | Lawson | D7/667 |
| D502,847 | S * | 3/2005 | Leonori | D7/667 |
| 6,949,190 | B2 * | 9/2005 | Hutzler | A47J 43/24 210/474 |
| D514,764 | S * | 2/2006 | Kumagai | D32/55 |
| D523,300 | S * | 6/2006 | Tung | D7/667 |
| D524,599 | S * | 7/2006 | Bodum | D7/400 |
| 7,111,546 | B2 * | 9/2006 | Siegel | A47J 43/24 34/194 |
| D533,030 | S * | 12/2006 | Kearney | D7/409 |
| D536,928 | S * | 2/2007 | Kearney | D7/505 |
| D538,607 | S * | 3/2007 | Miller | D7/667 |
| D543,796 | S * | 6/2007 | Lion | D7/667 |
| D558,001 | S * | 12/2007 | Stewart | D7/667 |
| D558,536 | S * | 1/2008 | Curtin | D7/667 |
| D558,537 | S * | 1/2008 | Curtin | D7/667 |
| 7,422,120 | B1 * | 9/2008 | Fried | A47J 43/22 210/473 |
| 7,467,718 | B1 * | 12/2008 | Donohue | A47J 43/24 210/473 |
| D584,111 | S * | 1/2009 | Eide | D7/667 |
| D593,244 | S * | 5/2009 | Cytrynowicz | D26/73 |
| D598,246 | S * | 8/2009 | Curtin | D7/667 |
| D599,627 | S * | 9/2009 | Raia | D7/667 |
| 7,678,271 | B2 * | 3/2010 | Curtin | A47J 43/24 220/666 |
| D629,264 | S * | 12/2010 | Curtin | D7/602 |
| D641,215 | S * | 7/2011 | Heiberg | D7/667 |
| D646,525 | S * | 10/2011 | Molayem | D7/505 |
| D651,482 | S * | 1/2012 | Kern | D7/667 |
| D655,139 | S * | 3/2012 | Harrington | D7/667 |
| D656,800 | S * | 4/2012 | Lee | D7/667 |
| D660,661 | S * | 5/2012 | Lee | D7/667 |
| D667,705 | S * | 9/2012 | Maiman | D7/667 |
| D671,803 | S * | 12/2012 | Myoung | D7/667 |
| 8,347,903 | B2 * | 1/2013 | de Raddo | A47J 43/24 220/756 |
| 8,348,084 | B2 * | 1/2013 | Dahlquist | A47G 19/02 220/574 |
| D706,088 | S * | 6/2014 | De Leo | D7/667 |
| 8,783,491 | B2 * | 7/2014 | Fu | B08B 3/06 220/23.89 |
| D712,208 | S * | 9/2014 | Murison | D7/667 |
| 8,871,092 | B2 * | 10/2014 | Curtin | A47J 43/22 220/666 |
| D718,579 | S * | 12/2014 | Lee | D7/667 |
| D718,580 | S * | 12/2014 | Lee | D7/667 |
| 8,961,786 | B1 * | 2/2015 | Farmer | A47J 43/24 210/473 |
| 9,044,082 | B2 * | 6/2015 | Kusuma | A45F 3/20 |
| D734,103 | S * | 7/2015 | Kin | D7/667 |
| 9,079,685 | B2 * | 7/2015 | Sudakoff | B65D 43/0218 |
| 9,089,237 | B1 * | 7/2015 | Griffith | A47J 19/005 |
| 9,155,448 | B1 * | 10/2015 | Gabbay | A47L 19/04 |
| D750,450 | S * | 3/2016 | Goldsmith | D7/667 |
| D754,494 | S * | 4/2016 | Schuler | D7/667 |
| D754,495 | S * | 4/2016 | Cotter | D7/667 |
| D759,420 | S * | 6/2016 | Lee | D7/354 |
| 9,370,278 | B1 * | 6/2016 | Suquet | A47J 43/24 |
| 9,386,886 | B2 * | 7/2016 | Lee | A47J 47/20 |
| D762,425 | S * | 8/2016 | Shah | D7/667 |
| D764,242 | S * | 8/2016 | Frank | D7/667 |
| 9,402,410 | B2 * | 8/2016 | So | A47J 19/027 |
| 9,408,413 | B2 * | 8/2016 | Oropeza | A47J 43/24 |
| 9,409,677 | B2 * | 8/2016 | Sudakoff | B65D 51/1683 |
| 9,427,136 | B2 * | 8/2016 | Kent | A47L 19/04 |
| D766,530 | S * | 9/2016 | Kent | D32/55 |
| D766,656 | S * | 9/2016 | Mac Innis | D23/209 |
| D766,675 | S * | 9/2016 | Schlegel | D7/601 |
| 9,439,553 | B1 * | 9/2016 | Gabbay | A47B 43/00 |
| 9,468,340 | B2 * | 10/2016 | So | A47J 43/24 |
| D771,997 | S * | 11/2016 | Affatato | D7/354 |
| D771,998 | S * | 11/2016 | Affatato | D7/354 |
| 9,603,502 | B2 * | 3/2017 | Park | A47L 15/30 |
| D784,771 | S * | 4/2017 | Goodman | D7/584 |
| D784,777 | S * | 4/2017 | Cotter | D7/667 |
| 9,615,603 | B2 * | 4/2017 | Chan | A47J 43/24 |
| D786,630 | S * | 5/2017 | Walsh | D7/667 |
| 9,642,496 | B2 * | 5/2017 | Girardin | A47J 37/1295 |
| D790,291 | S * | 6/2017 | Durmus | D7/667 |
| 9,700,178 | B2 * | 7/2017 | Vasquez | A23N 15/00 |
| 9,752,306 | B2 * | 9/2017 | Scamuffa | E03C 1/264 |
| 9,756,983 | B2 * | 9/2017 | Myoung | A47J 43/24 |
| D799,281 | S * | 10/2017 | Walsh | D7/667 |
| 9,801,488 | B2 * | 10/2017 | Affatato | A47J 27/04 |
| D803,015 | S * | 11/2017 | Farrell | D7/601 |
| D804,235 | S * | 12/2017 | Affatato | D7/354 |

(56) References Cited

U.S. PATENT DOCUMENTS

| | | | |
|---|---|---|---|
| D806,334 S * | 12/2017 | DiSabatino | D32/25 |
| 9,885,518 B2 * | 2/2018 | Dalla Piazza | A47J 43/24 |
| 9,926,105 B2 * | 3/2018 | Tsui | A47L 19/02 |
| D816,434 S * | 5/2018 | Burns | D7/667 |
| D816,435 S * | 5/2018 | Chang | D7/667 |
| D817,118 S * | 5/2018 | Chang | D7/667 |
| 9,958,107 B1 * | 5/2018 | Hobbs | F16M 13/00 |
| D819,914 S * | 6/2018 | Mendoza | D34/1 |
| 10,016,095 B2 * | 7/2018 | Hauser | A47J 43/24 |
| 10,028,622 B1 * | 7/2018 | Dugan | A47J 43/24 |
| 10,039,420 B2 * | 8/2018 | Housley | A47J 43/24 |
| 10,058,119 B1 * | 8/2018 | Chen | A23N 12/02 |
| D830,793 S * | 10/2018 | Nie | D7/667 |
| D835,477 S * | 12/2018 | Pawluskiewicz | D7/667 |
| D835,478 S * | 12/2018 | Kokubo | D7/667 |
| D835,479 S * | 12/2018 | Kokubo | D7/667 |
| D840,197 S * | 2/2019 | Lee | D7/667 |
| D846,958 S * | 4/2019 | Holding | D7/667 |
| 10,278,412 B2 * | 5/2019 | de Martrin-Donos | A47J 29/02 |
| 10,299,504 B2 * | 5/2019 | Elvin-Jensen | A23N 12/086 |
| D850,850 S * | 6/2019 | Vargo | D7/400 |
| D850,863 S * | 6/2019 | Miksovsky | D7/584 |
| D850,869 S * | 6/2019 | Holding | D7/667 |
| D854,324 S * | 7/2019 | Tsui | D3/304 |
| 10,383,353 B2 * | 8/2019 | Zhang | A47J 43/24 |
| 10,486,859 B2 * | 11/2019 | Sudakoff | B65D 43/0218 |
| 10,512,355 B2 * | 12/2019 | Davison | A47J 19/02 |
| D873,095 S * | 1/2020 | Hutzler | D7/629 |
| 10,544,989 B2 * | 1/2020 | Kilduff | F26B 11/02 |
| 10,631,687 B2 * | 4/2020 | Hagger | A47J 43/24 |
| 10,667,634 B2 * | 6/2020 | Wang | A47G 23/06 |
| D894,696 S * | 9/2020 | Tsui | D32/55 |
| D899,201 S * | 10/2020 | Stefani | D7/667 |
| D910,260 S * | 2/2021 | Xie | D7/354 |
| 10,966,574 B2 * | 4/2021 | Chen | B65F 1/1415 |
| 11,021,296 B2 * | 6/2021 | Sudakoff | B65D 51/1683 |
| D924,640 S * | 7/2021 | Kuo | D7/667 |
| D929,820 S * | 9/2021 | Tran | D7/667 |
| D931,680 S * | 9/2021 | Guerin | D7/354 |
| D935,853 S * | 11/2021 | Hong | D7/667 |
| D940,503 S * | 1/2022 | Guerin | D7/354 |
| D941,090 S * | 1/2022 | Guerin | D7/354 |
| D942,818 S * | 2/2022 | Ciarrocchi | D7/667 |
| 11,252,982 B2 * | 2/2022 | de Martrin-Donos | A47J 29/02 |
| D945,840 S * | 3/2022 | Zhou | D7/667 |
| D951,031 S * | 5/2022 | Weber | D7/628 |
| D959,214 S * | 8/2022 | Tehrani | D7/667 |
| D964,118 S * | 9/2022 | Zhan | D7/667 |
| 11,452,399 B1 * | 9/2022 | Murphy | A47J 19/005 |
| D989,572 S * | 6/2023 | Greenwood | D7/669 |
| D999,032 S * | 9/2023 | Zirges | D7/667 |
| 11,825,974 B1 * | 11/2023 | Murphy | A47J 19/005 |
| 11,871,759 B1 * | 1/2024 | Eskins | A22C 29/021 |
| D1,013,464 S * | 2/2024 | Zirges | D7/667 |
| D1,021,570 S * | 4/2024 | Huang | D7/667 |
| D1,022,624 S * | 4/2024 | Tsui | D7/667 |
| D1,025,721 S * | 5/2024 | Hong | D7/602 |
| D1,026,565 S * | 5/2024 | Wang | A47G 19/02 D7/602 |
| D1,038,715 S * | 8/2024 | Yoshikawa | D7/667 |
| 2003/0217649 A1 * | 11/2003 | Leonori | A47J 43/24 99/495 |
| 2004/0112821 A1 * | 6/2004 | Hutzler | A47J 43/24 210/470 |
| 2006/0096929 A1 * | 5/2006 | Repp | A47J 19/00 210/740 |
| 2007/0251874 A1 * | 11/2007 | Stewart | A47J 43/22 210/473 |
| 2007/0295227 A1 * | 12/2007 | Raineri | A47J 43/24 99/495 |
| 2008/0008802 A1 * | 1/2008 | Annunziata | A47J 43/24 426/489 |
| 2008/0197046 A1 * | 8/2008 | So | A47J 43/24 206/541 |
| 2008/0230462 A1 * | 9/2008 | Curtin | A47J 43/22 210/473 |
| 2009/0065428 A1 * | 3/2009 | Tomaini | A47J 43/24 210/485 |
| 2009/0065509 A1 * | 3/2009 | Schuler | A47J 43/24 220/573.1 |
| 2009/0211460 A1 * | 8/2009 | So | A47J 43/24 34/58 |
| 2010/0170840 A1 * | 7/2010 | Curtin | A47J 43/22 210/232 |
| 2010/0258011 A1 * | 10/2010 | Kahn | A47J 43/24 15/105 |
| 2011/0272342 A1 * | 11/2011 | Lee | A47J 43/24 210/470 |
| 2012/0055515 A1 * | 3/2012 | de Raddo | A47J 43/24 134/25.3 |
| 2012/0174798 A1 * | 7/2012 | Kulikowski | A47J 43/22 99/340 |
| 2012/0261327 A1 * | 10/2012 | Bagley | A47J 43/24 210/232 |
| 2013/0292345 A1 | 11/2013 | Jones | |
| 2013/0320008 A1 * | 12/2013 | Fu | A47L 15/26 220/23.83 |
| 2014/0061193 A1 * | 3/2014 | Sudakoff | B65D 43/0218 220/628 |
| 2014/0102961 A1 * | 4/2014 | Verveniotis | A47J 43/24 210/474 |
| 2014/0251890 A1 * | 9/2014 | Miller | A47J 43/24 210/469 |
| 2014/0291236 A1 * | 10/2014 | Thomas | A47J 43/24 210/482 |
| 2015/0216365 A1 * | 8/2015 | Lee | A47J 47/20 210/474 |
| 2015/0314914 A1 * | 11/2015 | Sudakoff | B65D 51/1683 220/666 |
| 2016/0007803 A1 * | 1/2016 | Girardin | A47J 43/24 210/323.1 |
| 2016/0073827 A1 * | 3/2016 | Katsumaru | A47J 43/24 210/473 |
| 2016/0183731 A1 * | 6/2016 | Merkazy | A45B 11/00 220/574 |
| 2016/0227967 A1 * | 8/2016 | Cooper | A47J 43/24 |
| 2016/0256011 A1 * | 9/2016 | Monroe | A47J 43/24 |
| 2017/0049273 A1 * | 2/2017 | Priestner | B65D 25/282 |
| 2017/0129649 A1 * | 5/2017 | Sudakoff | B65D 21/086 |
| 2017/0360258 A1 * | 12/2017 | Hagger | A47J 43/24 |
| 2018/0042428 A1 * | 2/2018 | Diver | A47J 45/062 |
| 2018/0049592 A1 * | 2/2018 | Silvis | A47J 43/0722 |
| 2018/0077962 A1 * | 3/2018 | Elvin-Jensen | B65D 25/30 |
| 2018/0092495 A1 * | 4/2018 | Rodgers | A47J 43/284 |
| 2018/0184850 A1 * | 7/2018 | Dugan | A47J 43/24 |
| 2018/0220692 A1 * | 8/2018 | Chen | B08B 3/047 |
| 2019/0029471 A1 * | 1/2019 | Chen | A47J 43/24 |
| 2019/0290047 A1 * | 9/2019 | Burridge | A47J 27/58 |
| 2019/0380374 A1 * | 12/2019 | Zhang | A23N 12/02 |
| 2020/0087030 A1 * | 3/2020 | Sudakoff | B65D 21/086 |
| 2021/0030212 A1 * | 2/2021 | Chen | A47L 19/04 |
| 2021/0177213 A1 * | 6/2021 | Young | B65D 21/086 |
| 2021/0300624 A1 * | 9/2021 | Sudakoff | B65D 21/086 |
| 2022/0015579 A1 * | 1/2022 | Escobedo | A47J 43/22 |
| 2023/0014423 A1 * | 1/2023 | Jones | A47J 43/24 |
| 2023/0292808 A1 * | 9/2023 | Digertt | A47J 43/24 15/3.1 |
| 2023/0292960 A1 * | 9/2023 | Hou | A47J 43/044 99/495 |
| 2024/0268593 A1 * | 8/2024 | Krus | A47J 19/005 |

OTHER PUBLICATIONS

Crate and Barrel, Footed Colander 10p25inSHF16, photograph from online shop, https://images.crateandbarrel.com/is/image/Crate/FootedColander10p25inSHF16, accessed Sep. 17, 2020.

Ringlow at istockphoto.com, Stainless Steel Colander, stock photo, file: licensed-image-colander.jpeg, https://www.stockphoto.com/

(56) References Cited

OTHER PUBLICATIONS photo/stainless steel-colander-gm534274685-56698386, accessed Apr. 4, 2021.

* cited by examiner

ELEVATED COLANDER

FIELD

The present disclosure relates generally to the field of kitchen tools for straining and more specifically to colanders.

BACKGROUND

Generally, colanders are used to strain a mixture of a solid food item and liquid and drain the liquid portion into a sink, leaving the solid portion in the colanders. When the colanders are used, they are typically placed within the sink and either have food placed inside to be rinsed off or are used to drain off liquid from solid food to separate the solid food and liquid from one another. When draining fluid, or rinsing food, water that comes from a pot or faucet may be poured over the food and then into the sink through the colander. Once the water hits the sink basin, the water may splash back up toward the food due to the downward momentum of the fluid. Because the sink is used for more than just draining water or fluid, sinks may be filled with bacteria or other contaminants causing the bacteria or other contaminants to splash back onto the food when the colander is used.

SUMMARY

Various embodiments relate to a colander having a base with a top base surface and a bottom base surface that are opposite each other. The base defines a vertical central axis that is perpendicular to a tangent plane of the top and/or bottom base surface, and the vertical central axis intersects a center of the top base surface and bottom base surface. A curved wall extends from the top base surface away from the bottom base surface and towards a top wall edge so that the curved wall is positioned between the top base surface and a terminating top surface edge. The curved wall encircles the vertical central axis to define an internal cavity having an inner diameter larger at some intermediate point along the curved wall between the bottom wall edge and the top wall edge than either diameter at the bottom wall edge or top wall edge. The curved wall also has a plurality of openings between the bottom wall edge and top wall edge. A support structure extends from the bottom base surface away from the top base surface.

In some of these embodiments, the top base surface defines a curved lower ring portion between the bottom wall edge and the terminating top surface edge. The terminating top surface edge defines a top base surface radius that extends from the vertical central axis to the terminating top surface edge, and the support structure defines a support structure radius extending from the vertical central axis to an outermost point of the intersection of the support structure and the bottom base surface. In such embodiments, the top base surface radius is larger than the support structure radius.

Various embodiments may also contain an upper ring that extends radially outward from the top wall edge toward an upper ring terminating edge. The upper ring defines a touch surface for gripping the colander.

These embodiments may also have the terminating top surface edge of the top base surface contact a terminating bottom surface edge of the bottom base surface where the bottom base surface defines a first radius that extends from the vertical central axis to the terminating bottom surface edge, and the upper ring defines a second radius that extends from the vertical central axis to the upper ring terminating edge. In these embodiments, the first radius is larger than the second radius.

Various embodiments include a curvature that extends from the terminating top surface edge toward the center of the top base surface such that the center of the top base surface is positioned significantly vertically above the terminating top surface edge.

The curved wall in some embodiments may be defined by a parabolic curve extending from the bottom wall edge to the top wall edge, where a vertex of the parabola is disposed in-between.

In some of these embodiments, the length of the lower curvature below the vertex is greater vertically than the length of the upper curvature above the vertex.

In other embodiments, the length of the upper curvature is greater than the length of the lower curvature.

Some embodiments have a bottom row of openings from the plurality of openings where the bottom row of openings is adjacent to the bottom wall edge of the curved sidewall and are open circles.

In some embodiments, the plurality of openings can be staggered horizontally from vertically adjacent holes.

Various embodiments may also have a first radius defined by the bottom base surface extending from the vertical central axis to the terminating bottom surface edge, and a skirt included in the support structure extending generally vertically from the bottom base surface toward a skirt end to define an angled skirt wall. The angled skirt wall may have a second radius extending from the vertical central axis to the intersection of the angled skirt wall and the skirt end such that the second radius is smaller than the first radius.

In these embodiments, there may also be a wall radius extending from the vertical central axis to the bottom wall edge where the skirt is curved concavely as the skirt extends inward toward the vertical central axis while the skirt abuts the bottom base surface.

Various embodiments relate to a colander with a base that has a top base surface and a bottom base surface that are opposite each other. A terminating top surface edge of the top base surface contacts a terminating bottom surface edge of the bottom base surface, which defines a major axis of the base. The base also defines a vertical central axis perpendicular to the major axis of the base that intersects the top base surface and bottom base surface. A curved wall then extends from the top base surface along a bottom wall edge away from the bottom base surface toward a top wall edge such that the curved wall is between the center of the top base surface and the terminating top surface edge of the top base surface. The curved wall encircles the vertical central axis, defining an internal cavity. The curved wall also has a plurality of openings between the bottom wall edge and the top wall edge. The colander also includes a support structure that extends from the bottom base surface away from the top base surface.

In some embodiments, the curved wall is parabolic in shape, having a vertex disposed between the bottom wall edge and the top wall edge. The parabolic curved wall may have an upper curvature that extends from the vertex to the top wall edge and a lower curvature that extends from the vertex to the bottom wall edge.

Some of these embodiments have a first radius extending from the vertical central axis to the terminating bottom surface edge and a second radius extending from the vertical central axis to the vertex where the first radius is larger than the second radius.

Some of these embodiments include a plurality of legs where each leg in that plurality of legs extends from the bottom base surface at a first radial distance from the vertical central axis toward a foot surface positioned at a second radial distance from the vertical central axis such that the second radial distance is greater than the first radial distance. Each of the legs in the plurality of legs may also be radially spaced from each foot on the adjacent leg to define a gap through which fluid can flow. The foot surface may be the bottom-most surface of the leg, and the foot may be the portion of the leg having the foot surface.

In various embodiments, the support structure may include a skirt that extends from the bottom base surface toward a skirt end such that the skirt extends substantially vertically from the bottom base surface to the skirt end, creating an angled skirt wall. A plurality of legs may extend from the skirt end such that each leg in the plurality of legs is radially spaced from adjacent legs to define a gap through which fluid can flow.

In some embodiments, the angled skirt has a skirt radius that extends from the vertical central axis to the intersection of the angled skirt wall and the skirt end where the skirt radius is smaller than the radius from the center of the bottom base surface to an edge of the bottom base surface.

Various embodiments relate to a colander with a base that has a top base surface and a bottom base surface that are opposite each other. The base defines a vertical central axis that intersects a center of the top base surface and a center of the bottom base surface. A curved wall extends from the top base surface along a bottom wall edge away from the bottom base surface toward a top wall edge. The curved wall encircles the vertical central axis to define an internal cavity. The curved wall also has a plurality of openings between the bottom wall edge and the top wall edge. These embodiments may include a support structure that extends from the bottom base surface away from the top base surface. That support structure may have a plurality of legs. The plurality of legs may include a first leg, a second leg positioned radially away from the first leg, a third leg positioned radially away from the second leg, a fourth leg positioned radially away from the third leg, a fifth leg positioned radially away from the fourth leg, and a sixth leg positioned radially away from the fifth leg and radially away from the first leg. The positioning of the legs may create a first gap, a second gap, a third gap, a fourth gap, a fifth gap, and a sixth gap, respectively.

In some embodiments, a terminating top surface edge contacts a terminating bottom surface edge of the bottom base surface. The top base surface defines a curved lower ring portion that extends between the bottom wall edge and the terminating top surface edge. The terminating top surface edge has a top base surface radius that extends from the vertical central axis to the terminating top surface edge. The support structure has a support structure radius that extends from the vertical central axis to an outermost point of the intersection of the support structure and the bottom base surface.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying diagrams.

DETAILED DESCRIPTION

The present disclosure relates to colanders or similar kitchen straining equipment that prevent the contamination of food contained therein from fluids that have contacted surfaces below the colander. Most existing methods for straining utilize devices that are placed over or in a sink (or similar draining basin). Additionally, most existing devices have holes on the bottom of the device to increase flow of liquid through the device. However, current devices allow for two possible methods of food contamination. First, the food may be contaminated by the pooling fluid in the bottom of the sink contacting the food through the colander if the colander is positioned too low in the sink relative to the level of the pooling fluid in the sink. Second, the food in the colander may be contaminated by fluids that contact the drain or bottom of the sink and splash upwards back into the colander through the holes or mesh.

The present disclosure describes an apparatus that may prevent the contamination of food in a colander by impeding fluids from splashing back onto a part of the colander with holes and by elevating the colander such that fluids can pool below the colander while they drain without contaminating the food remaining in the colander. The present disclosure describes structural features that provide these benefits, including an embodiment of a colander with an overhanging portion disposed below all of the holes of the colander that extends outward from the colander such that a straight line cannot be drawn straight downward from any single hole without contacting another surface of the colander. In this embodiment, when fluids attempt to splash back up from a surface below the colander, they may contact the other surface instead of entering the holes of the colander. The colander may also elevated above a bottom of a sink by a support surface that allows for fluids to drain underneath the colandar. The support surface may have a height that is sufficient to facilitate the water to drain below the colander before the pooling water is able to re-enter the cavity of the colander.

Figure 1:
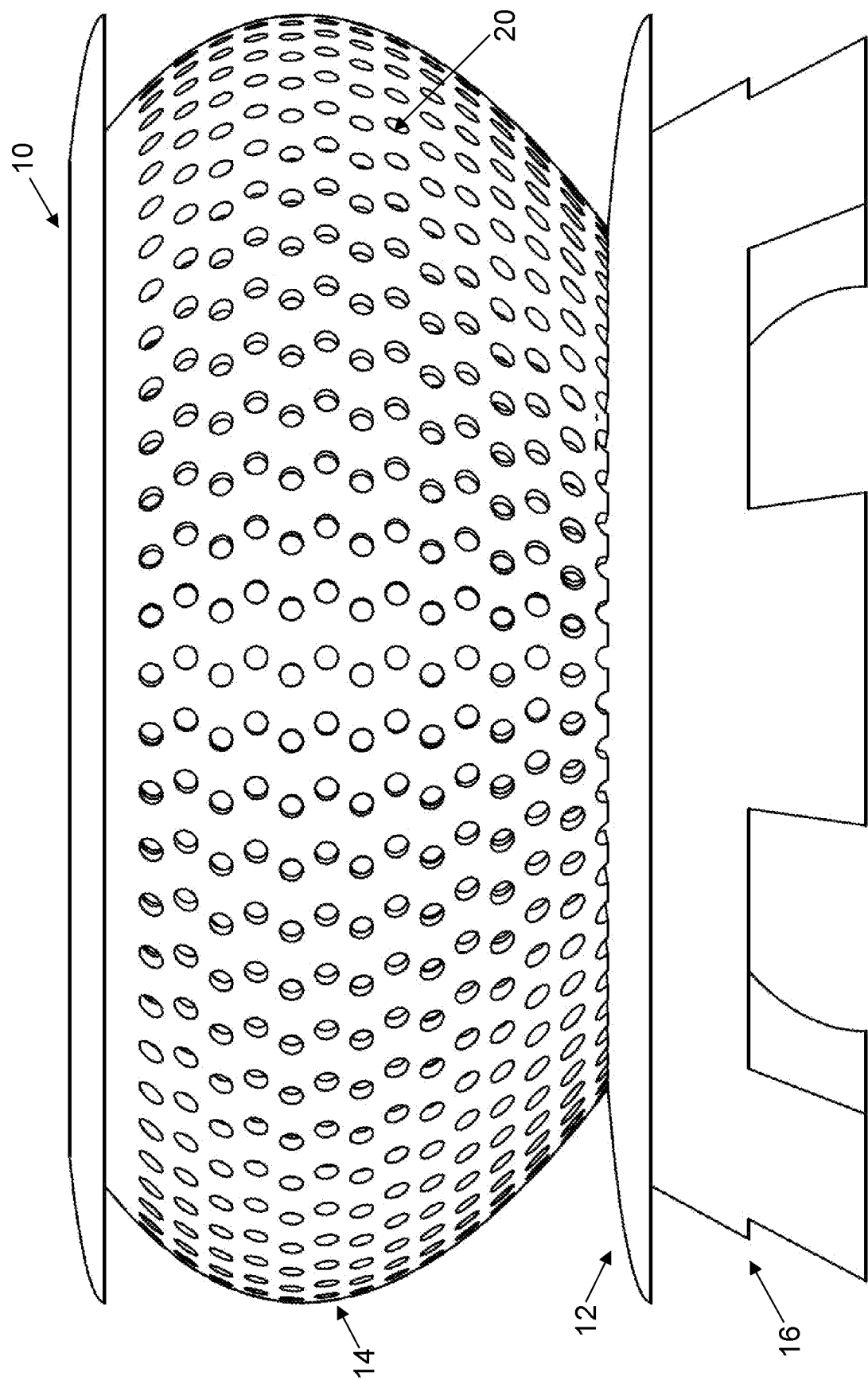
FIG. 1 is a front plan view of a colander, according to an example embodiment.
Figure 2:
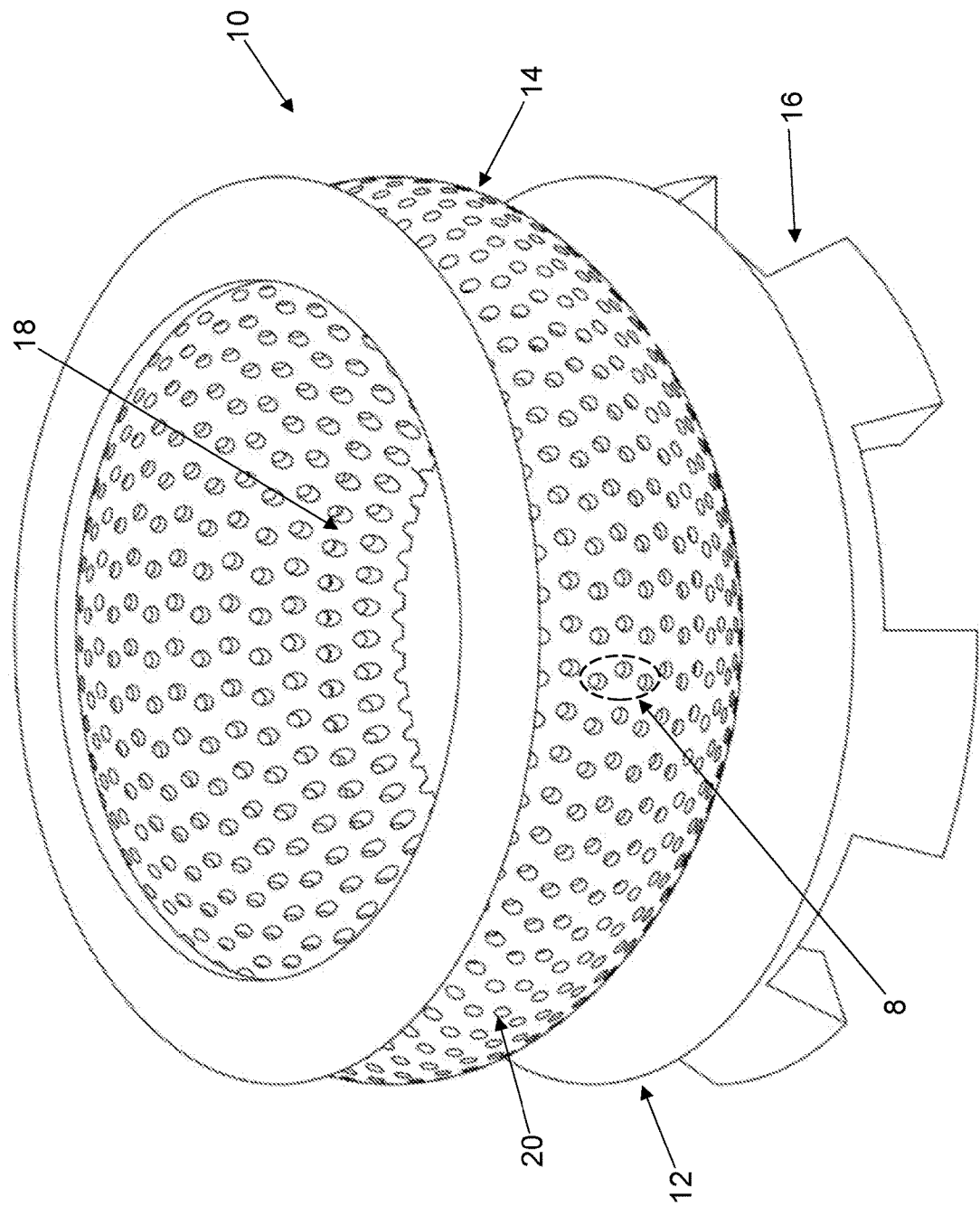
FIG. 2 is a top perspective view of the colander of FIG. 1.

FIGS. 1 & 2 depict a colander 10, according to an example embodiment. The colander 10 has a base 12, a curved wall 14, and a support structure 16. The curved wall 14 extends vertically away from the base 12. The support structure 16 extends away from the base 12 in a direction opposite the curved wall 14. The support structure 16 elevates the base 12 to facilitate fluids to drain and/or flow below the base 12. The base 12 and the curved wall 14 form the internal cavity 18 that may contain contents poured into the colander 10 while the fluids are drained from the colander 10. During usage, fluids may be separated from the solid contents poured into the internal cavity 18 of the colander 10, as shown in FIG. 2, by traveling through one or more openings in the plurality of openings 20 of the curved wall 14 and over the base 12.

The colander 10 may be made of a metal material (e.g., stainless steel), for durability and strength, a plastic material, for cost and ease of manufacture, or another material that possesses antimicrobial properties. In some embodiments, each of the base 12, support structure 16, and the curved wall 14 may be made of the same material. In other embodiments, at least one of the base 12, support structure 16, and the curved wall 14 is made of a different material from the other components.

Figure 3:
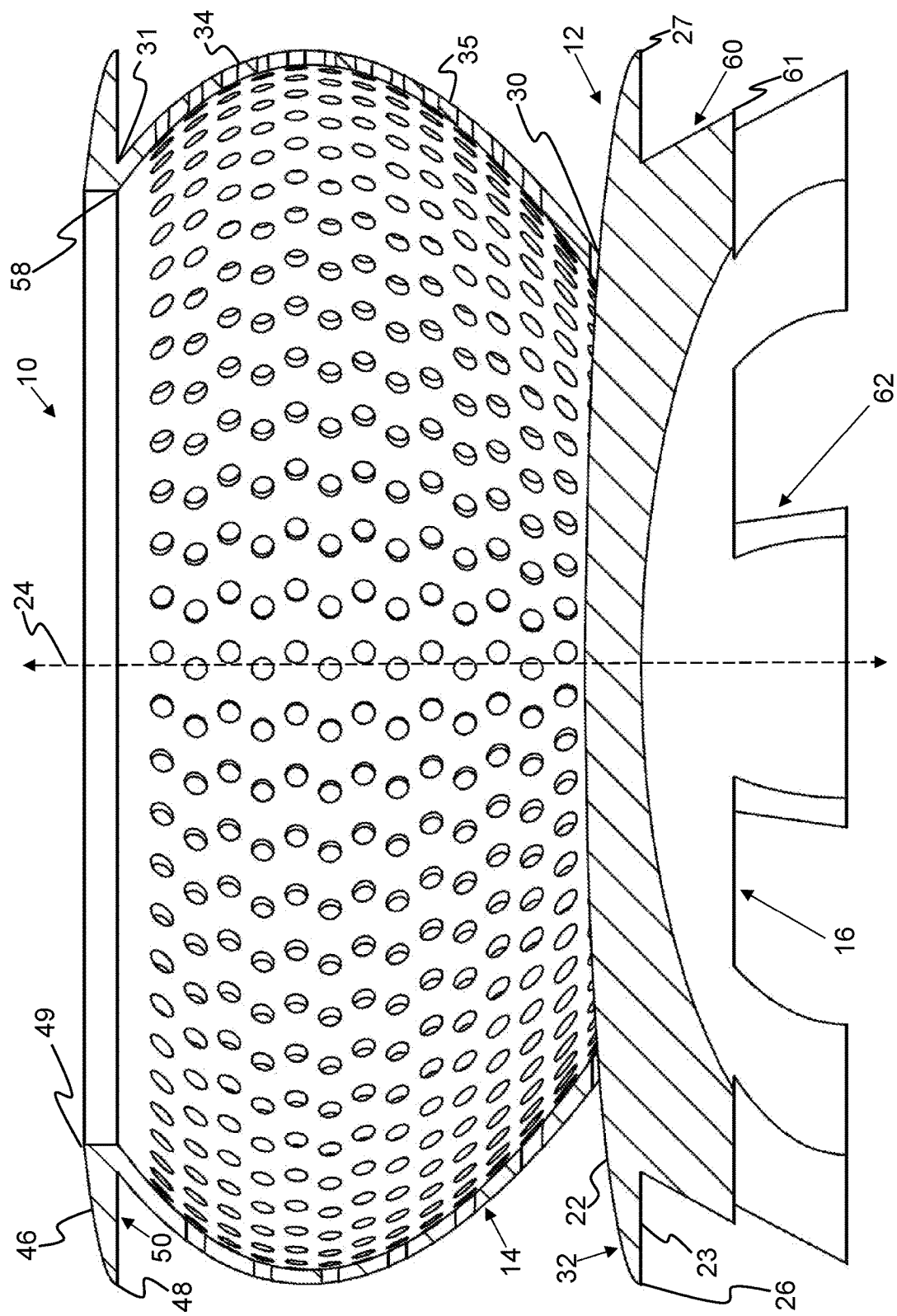
FIG. 3 is cross-sectional view of the front of the colander of FIG. 1.
Figure 5:
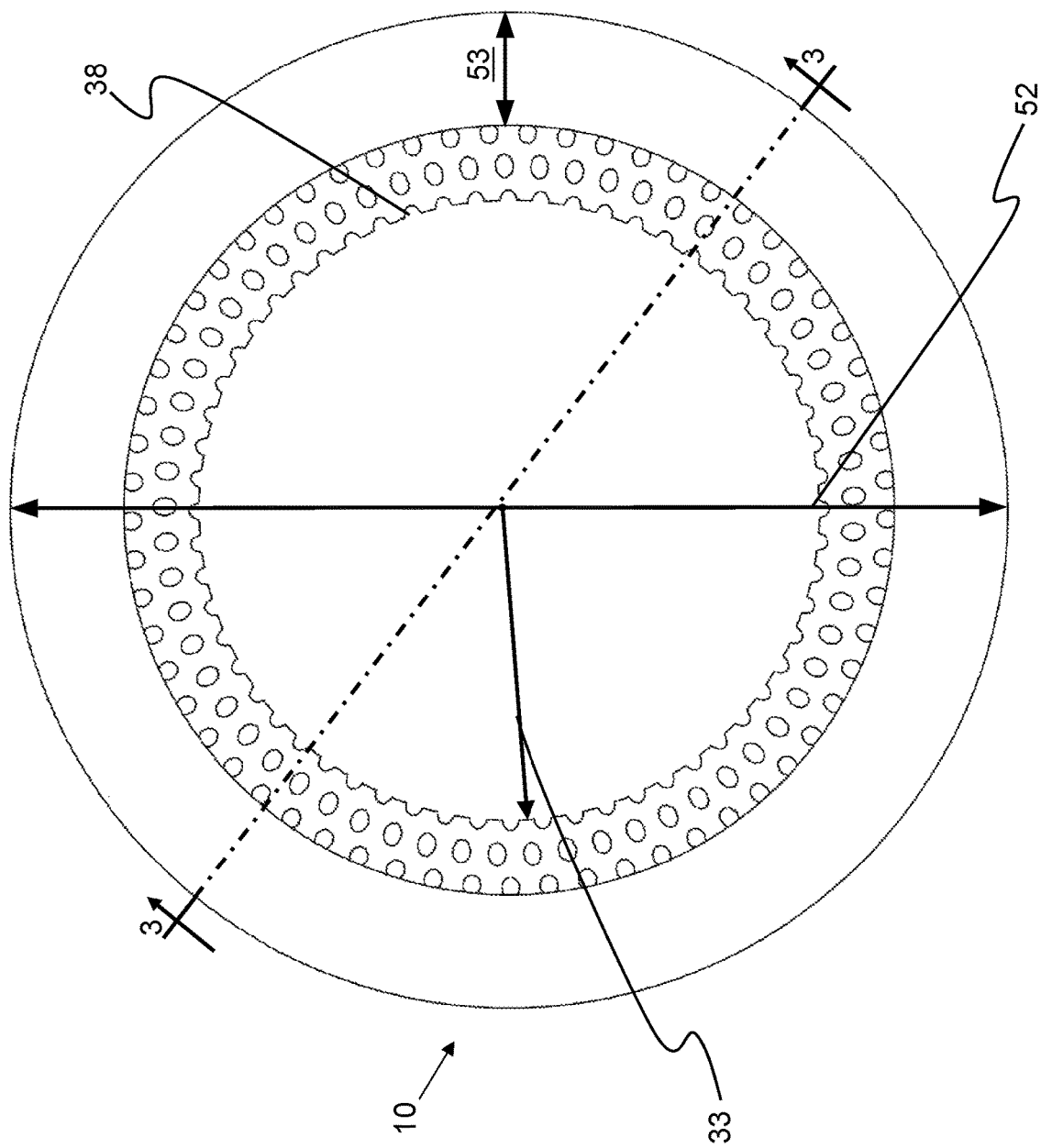
FIG. 5 is a top view of the colander of FIG. 1.
Figure 6:
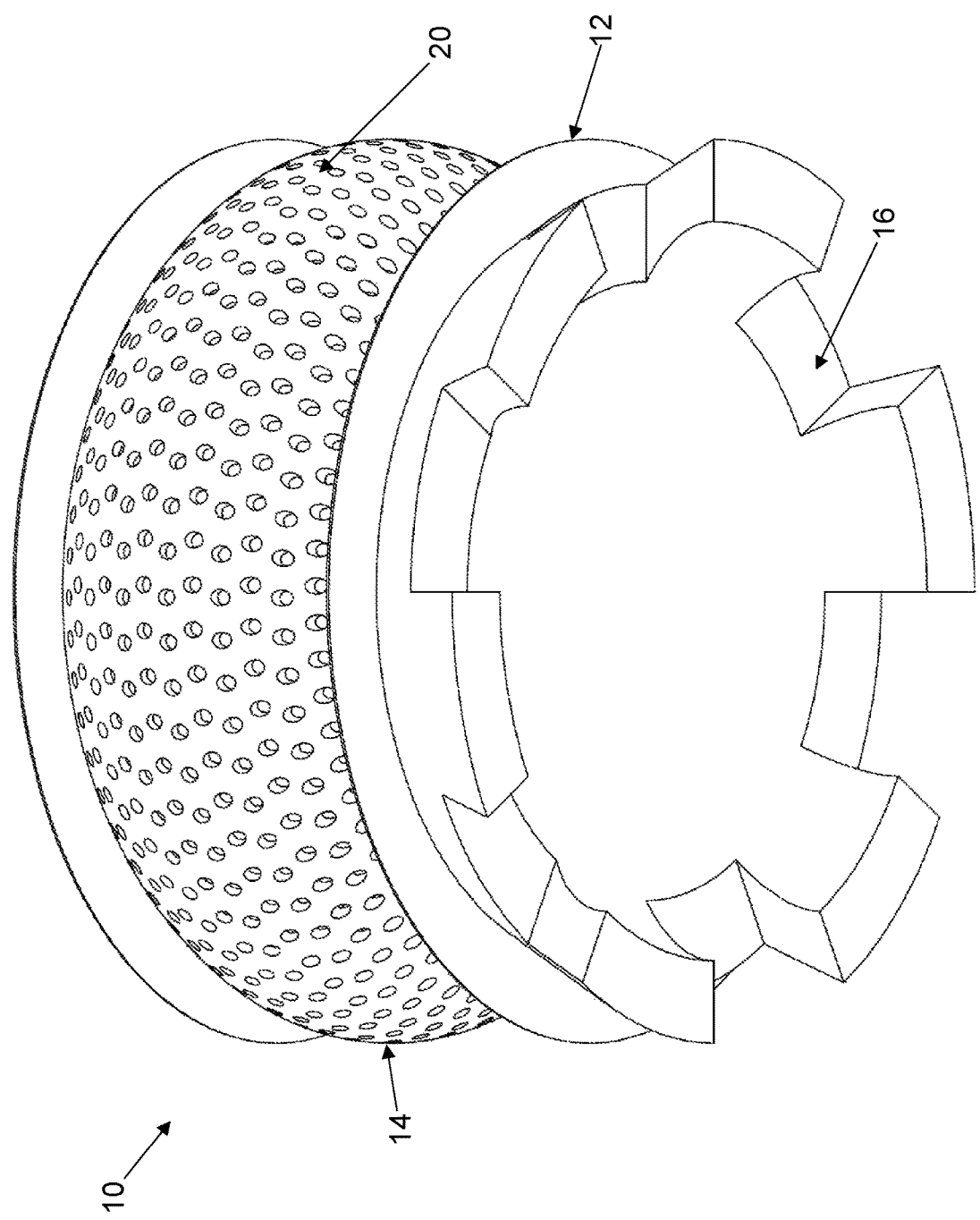
FIG. 6 is a bottom perspective view of the colander of FIG. 1.

Turning to FIG. 3, a cross-sectional view of the colander 10, along the cross-sectional line 3 demarcated in FIG. 5, is shown. The base 12 has a top base surface 22 and a bottom base surface 23 that is positioned vertically below the top base surface 22, such that the base 12 spans between the top base surface 22 and the bottom base surface 23. The base 12 defines a vertical central axis 24 that intersects a center of the top base surface 22 and a center of the bottom base surface 23. The vertical central axis 24 is perpendicular to a tangent plane of at least one of the top base surface 22 or the bottom base surface 23.

The top base surface 22 has a top surface edge 26 (e.g., terminating top surface edge) and the bottom base surface 23 has a bottom surface edge 27 (e.g., bottom surface terminating edge). In some embodiments, the top surface edge 26 contacts the bottom surface edge 27. In those embodiments, the distance from both the top surface edge 26 and the bottom surface edge 27 to the vertical central axis 24 may be half the length of a diameter 28 of the base 12 as depicted in FIG. 4.

While the top surface edge 26 is depicted as contacting the bottom surface edge 27 in FIGS. 1-8, in some embodiments, one or more intermediary surfaces may be positioned between and connect the top surface edge 26 and the bottom surface edge 27. For example, in some embodiments, the top surface edge 26 and the bottom surface edge 27 may contact some intermediary surface that exists between the top surface edge 26 and the bottom surface edge 27. This intermediary surface may have a wide variety of orientations. For example, the intermediary surface may be a substantially vertical intermediary surface to elongate the distance between the top surface edge 26 and the bottom surface edge 27. Such an intermediary surface may not interfere with the elevated colander 10 draining fluids from solids and impeding backsplash, as described herein.

The top base surface 22 may work in conjunction with the curved wall 14 to contain the contents poured into the colander 10 and to help drain fluids from the colander 10. The top base surface 22 may have a curvature that facilitates the draining of fluids by operation of gravity pulling fluids away from the vertical central axis 24 and toward the top surface edge 26, and ultimately out of the internal cavity 18 of the colander 10. The top surface edge 26 may serve as a point where fluids drained from the colander 10 are released to the space below the colander 10.

Figure 4:
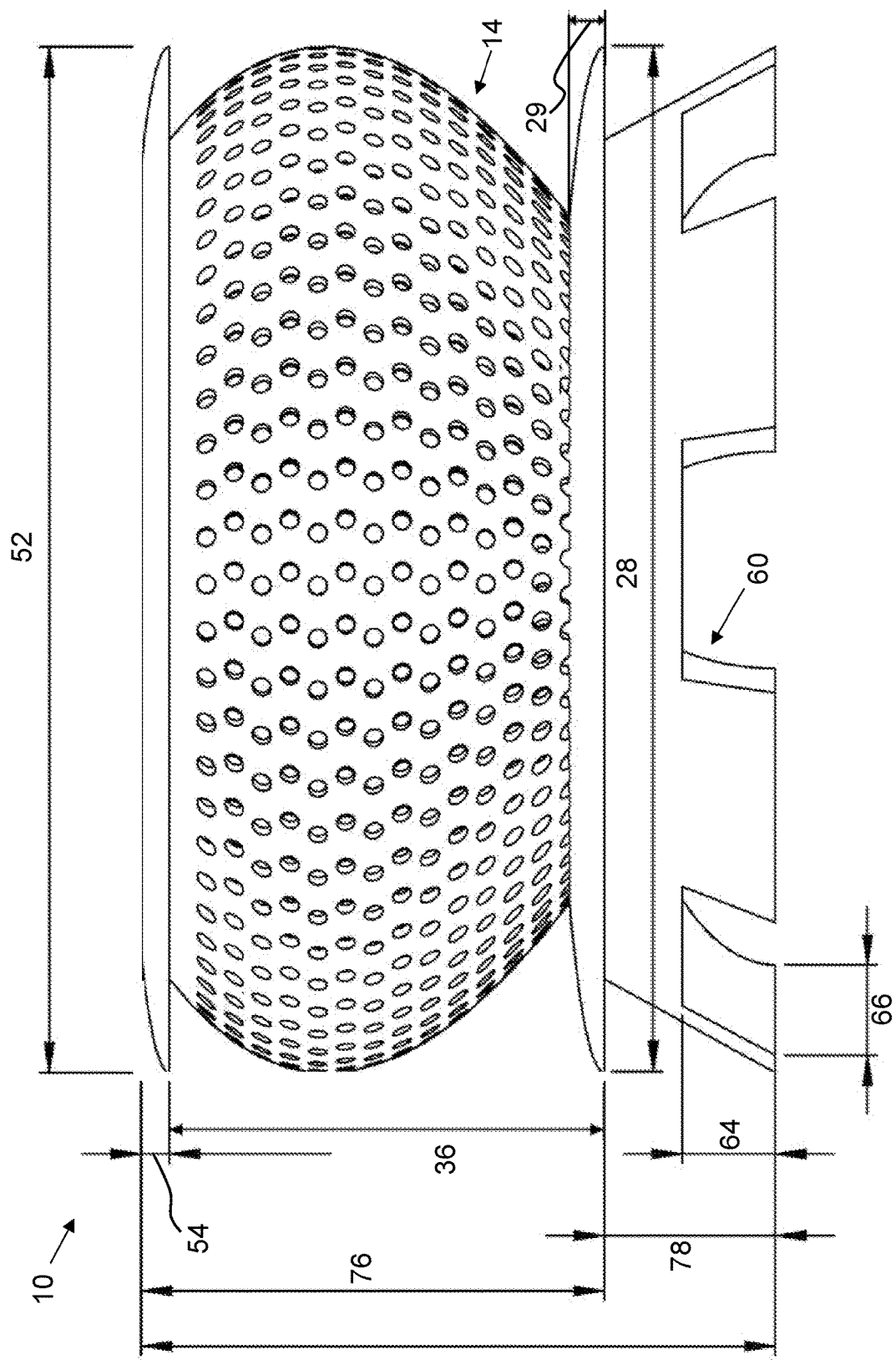
FIG. 4 is a side view of the colander of FIG. 1.

Referring to FIG. 4, the top base surface 22 may be curved defining a top base surface height 29 between the vertical height of the top surface edge 26 to the vertical height of the point of contact between the top base surface 22 and the vertical central axis 24. In some embodiments, the top base surface 22 is gradually sloped downward from the curved wall 14 toward the top surface edge 26, and the top base surface height 29 may be approximately one half (½) inch (e.g., 12.7 mm) to facilitate a slow and/or smooth flow of fluids over it. In other embodiments, the downward slope of the top base surface 22 may be sharper, and the top base surface height 29 may be less than about one quarter (¼) inch (e.g., 6.35 mm) or one sixteenth (¹⁄₁₆) inch (e.g., 1.57 mm) in height. In some embodiments, the curved slope may have a slight taper to give a waterfall effect to fluids drained from the colander 10.

As shown in FIG. 3, the curved wall 14 may extend upward from the top base surface 22 along the bottom wall edge 30. The bottom wall edge 30 may be positioned along the top base surface 22 between the vertical central axis 24 and the top surface edge 26. The curved wall 14 may extend generally vertically upward away from the bottom wall edge 30 and terminate at a top wall edge 31. A plurality of openings 20 may be defined on the curved wall 14 between the bottom wall edge 30 and the top wall edge 31.

As shown in FIG. 5, the bottom wall edge 30 defines a lower wall radius 33 from the vertical central axis 24 (see FIG. 3) and defines a lower ring portion 32 (see FIG. 3) of the base 12 extending beyond the surface of the curved wall 14. The lower ring portion 32 may provide protection of the contents of the interior cavity 18 from backsplash of fluids by shielding the curved wall 14 from line-of-sight from a surface below the colander 10, as shown in FIG. 3. Fluids that exit the internal cavity 18 may pass through the plurality of openings 20 and then over the lower ring portion 32 along the top base surface 22. As the fluids pass over the lower ring portion 32 and off the top surface edge 26, the fluids' kinetic energy may be reduced, further reducing splashing and backsplash when the fluids contact a surface (e.g., a sink) below the colander 10.

Turning to FIG. 4, the curved wall 14 has a curved wall height 36 between the top wall edge 31 and the bottom base surface 23. The curved wall 14 may have a distance between the top wall edge 31 and the bottom wall edge 30 equal to the curved wall height 36 minus the top base surface height 29. In some embodiments, the curved wall 14 may be curved in a parabolic shape. As shown in FIG. 3, the parabolic shape may define a vertex between an upper curvature 34 above the vertex and below the top wall edge 31, and a lower curvature 35 below the vertex and above the bottom wall edge 30. The curved wall 14 may be curved such that the vertex is above a midpoint of the curved wall height 14. Thus, a length of the lower curvature 35 may be greater than a length of the upper curvature 34. By making the length of the lower curvature 35 greater than the length of the upper curvature 34, a larger surface area of the curved wall 14 may face generally vertically downward to facilitate greater drainage. In embodiments in which the curved wall 14 includes a portion facing more vertically downward than facing vertically upward, while still providing a large internal cavity 18, the portion generally facing vertically downward may facilitate better draining.

The curved wall 14 may form a continuous wall, perforated with the plurality of openings 20, that encircles the vertical central axis 24. The curved wall 14 and the top base surface 22 may define an internal cavity 18. The internal cavity 18 may provide a space in which desired contents may be held by the colander 10 when draining fluids that separate from the desired contents. The curve of the curved wall 14 may create a greater space within the internal cavity 18, while facilitating draining of fluids, than a straight wall may. Fluids may be drained through the curved wall 14 via the plurality of openings 20. Each opening of the plurality of openings 20 may be sized such that fluids may drain through them while desired contents (e.g., solid food) are too large to pass through the plurality of openings 20.

Figure 8:
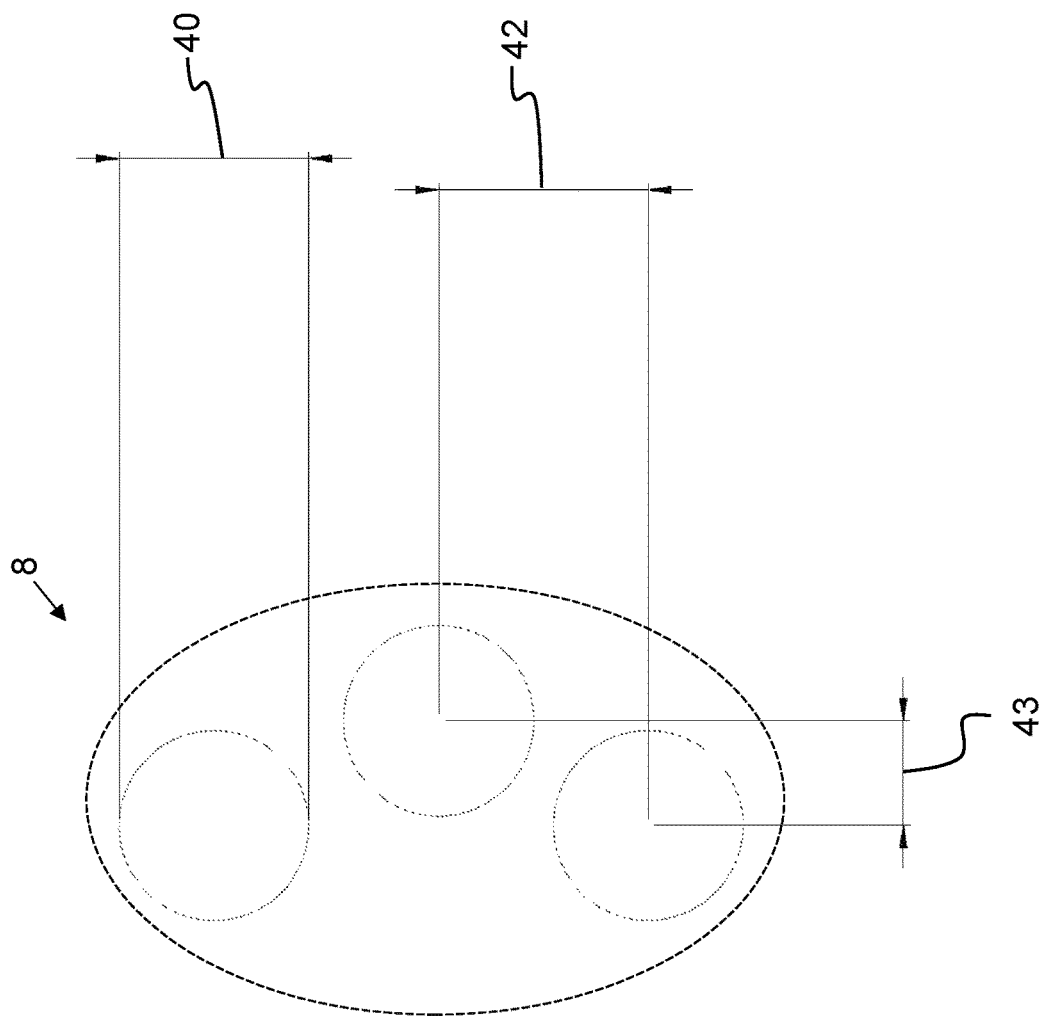
FIG. 8 is a close-up view of a portion of the plurality of openings in the colander of FIG. 2.

The plurality of openings 20 may be arranged in rows. By arranging the plurality of openings 20 in rows, the curved wall 14 may have a consistent structural integrity. The multiple rows of the plurality of openings 20 may also be arranged in a staggered pattern to further promote structural integrity. As used herein, a "staggered pattern" refers to a pattern in which the individual openings within each row of openings does not vertically align with the individual openings in the adjacent row above or below it. FIG. 8 illustrates a close-up view of a portion 8 of the plurality of openings 20 (see FIG. 2) that depicts the staggering of the openings in the plurality of openings 20.

As shown in FIGS. 3 and 5, the plurality of openings 20 may begin with a bottom row of openings 38 that are positioned adjacent to the bottom wall edge 30. As fluids may be caught by a corner formed between the curved wall 14 and the top base surface 22, the bottom row of openings 38 may have a row of openings over the top of the top base surface 22 such that the bottom row of openings 38 may be shaped as semi-circles centered near or along the top base surface 22 and intersected by the top base surface 22. The semi-circles may be generally circular or elliptical above a level of the top base surface 22 while having a generally flat bottom horizontally aligned with the top base surface 22. The bottom row of openings 38 shaped as semi-circles may facilitate fluids to flow out of the internal cavity 18 without leaving contact with the top base surface 22 from the vertical central axis 24 to the top surface edge 26.

Turning back to FIG. 8, in some embodiments, an opening diameter 40 of each opening in the plurality of openings 20 may be between about 2 to 3 millimeters. This size of opening may facilitate fluids to enter while also being too small for most desirable food solids, e.g., small pasta, from passing through. For an embodiment with this range of opening diameter 40, a spacing between the openings may be between about 1 to 3 millimeters. In some embodiments, a horizontal opening spacing 43 between centers of the openings 20 on one row with the closest openings on an adjacent row may be about 3 to 4 millimeters, and a vertical opening spacing 42 between centers of the openings 20 on one row with the closest openings on an adjacent row may be about 7 to 8 millimeters. This arrangement may facilitate sufficient structural stability of the curved wall 14 while providing enough openings to facilitate effective drainage of fluids. In some embodiments, the rows of openings 20 may be staggered and the spacing between the centers of the openings may be about 2 to 3 millimeters in both vertical opening spacing 42 and horizontal opening spacing 43. This arrangement may support the structural stability of staggered rows while maximizing the number of openings in the curved wall 14.

Turning back to FIG. 3, an upper ring 46 may extend horizontally from the top wall edge 31 to an upper ring terminating edge 48 and vertically from the top wall edge 31 to an upper ring top edge 49. The upper ring 46 may have a bottom touch surface 50 to facilitate holding and moving of the colander 10 by a user. The upper ring 46 may have an upper ring diameter 52, as shown in FIG. 4. The upper ring diameter 52 may be smaller than the diameter 28 of the base 12 such that a vertical line drawn from a surface below the colander 10 may not reach the upper ring 46 without passing through the base 12. This arrangement may prevent fluids from splashing up onto the upper ring 46 and running down to the curved wall 14. For example, the upper ring 46 may have an upper ring diameter 52 of 11 inches and an upper ring width 53 (see FIG. 5) of one and one quarter (1¼) inch (e.g., 31.75 mm), and the base 28 may have a diameter larger than 11 inches. In some embodiments, the upper ring height 54 may be between one half (½) and three quarters (¾) inch. This height may facilitate the handle to be effectively grasped when using the colander 10. In various embodiments, the upper ring 46 may range in width between zero and several inches. In various embodiments, the colander 10 may not include the upper ring 46, such that the top wall edge 31 defines the top of the colander 10.

Figure 9:
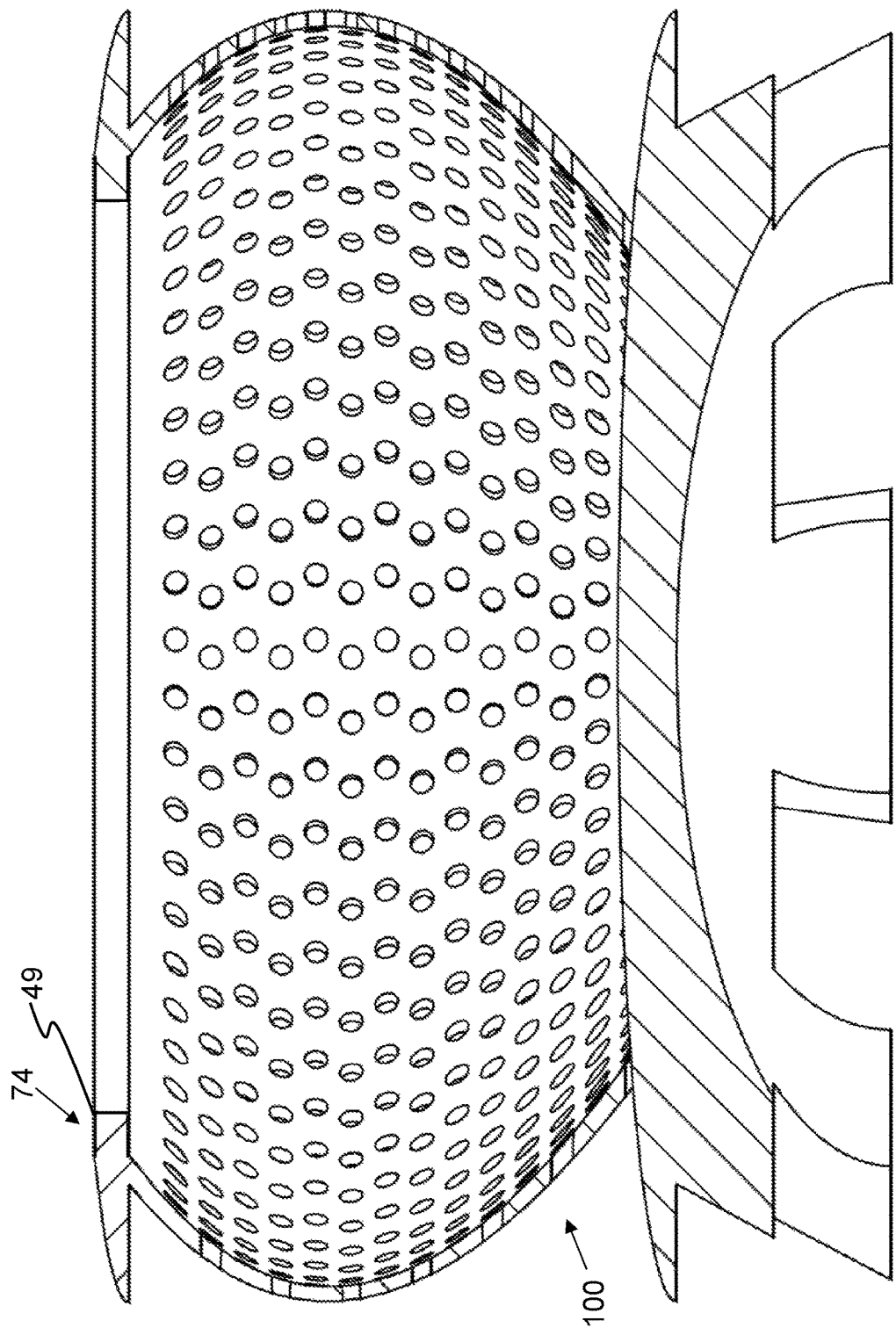
FIG. 9 is a cross-sectional view of a colander, according to another example embodiment.

Turning to FIG. 9, in some embodiments of a colander 100, the upper ring 46 may extend horizontally inward from the top wall edge 31 to define a cavity overhang 74. In these embodiments, the cavity overhang 74 may extend horizontally above a portion of the internal cavity 18 near the curved wall 14. In these embodiments of the colander 100, the cavity overhang 74 may impede contents of the colander 100 from exiting the colander 100 by providing a horizontal surface to redirect the contents back within the internal cavity 18. In some embodiments, the cavity overhang 74 may extend over the internal cavity 18 from an inner wall edge 58 by about one (1) inch.

Turning back to FIGS. 1, 2, and 3, the support structure 16 may extend substantially vertically downward away from the base 12. The support structure 16 may be connected to and extend downward from the bottom base surface 23. In some embodiments, the support structure 16 may include of a skirt 60 and a plurality of legs 62. The skirt 60 may be connected to the bottom base surface 23. The skirt 60 may have a skirt edge 61 along its bottom portion. The plurality of legs 62 may extend downward from the skirt edge 61 away from the skirt 60. The plurality of legs 62 may extend both downward away from the skirt 60 and radially away from the vertical central axis 24. By extending the plurality of legs 62 away from the vertical central axis 24, the plurality of legs 62 may stabilize the colander 10 against forces exerted on it by pouring contents into the colander 10. The plurality of legs 62 may also be of equal or unequal radial width, and may be arranged in an equal or unequal distribution around the vertical central axis 24.

In some embodiments, the plurality of legs 62 may include three or four legs. This number of legs may facilitate manufacturing using fewer component parts. In other embodiments, the plurality of legs 62 may include five or more legs, which may provide more points of stabilization for the support structure 16. The plurality of legs 62 may extend vertically downward away from the bottom base surface 23 and horizontally outward away from the vertical central axis 24. Extending the plurality of legs 62 horizontally creates greater stabilization against forces applied horizontally to the colander 10. The legs may be curved along their length and width while extending generally horizontally away from the vertical central axis 24.

Figure 7:
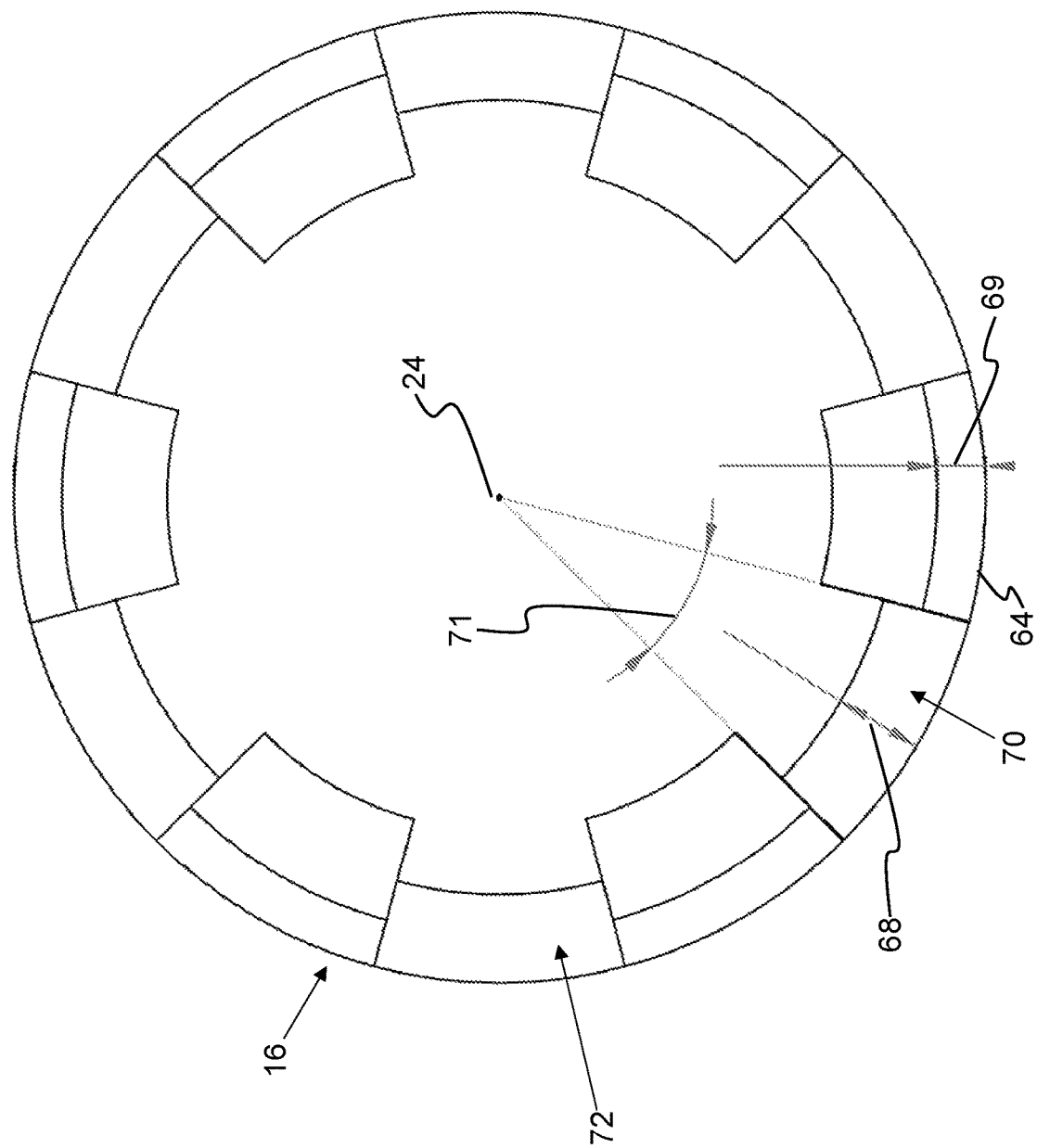
FIG. 7 is a bottom view of the colander of FIG. 1.

As shown in FIG. 7, the space (e.g., gap) between two legs in the plurality of legs 62 defines a first space 70 between the legs 62 having a radial space width 71. This space facilitates fluids to drain between the plurality of legs 62. A second space 72 may be defined between another pair of the plurality of legs 62. The radial space width 71 may be equal for all spaces between pairs of the legs 62 to facilitate even draining of fluids and prevent pooling of fluid on one side of the colander 10. In other embodiments, the legs may be unequally spaced apart to increase horizontal stability in some directions more than in other directions.

In some embodiments, each leg in the plurality of legs 62 may have a leg height 64 between about three quarters (¾) inch (e.g., 19.05 mm) and one and one quarter (1¼) inches (e.g., 31.75 mm). In some embodiments, each leg in the plurality of legs 62 may have a leg thickness 69 between about one-quarter (¼) inch (e.g., 6.35 mm) and one and three-quarters (¾) inch (e.g., 19.05 mm). For example, in the embodiment shown in FIG. 7, the first leg in the plurality of legs 62 and the second leg in the plurality of legs 62 are separated by a first gap, the second leg in the plurality of legs 62 and the third leg in the plurality of legs 62 are separated by a second gap, the third leg in the plurality of legs 62 and the fourth leg in the plurality of legs 62 are separated by a third gap, the fourth leg in the plurality of legs 62 and the fifth leg in the plurality of legs 62 are separated by a fourth gap, the fifth leg in the plurality of legs 62 and the sixth leg in the plurality of legs 62 are separated by a fifth gap, and the sixth leg in the plurality of legs 62 and the first leg in the plurality of legs 62 are separated by a sixth gap. The gaps between the legs may be defined by the skirt 60 above the gaps. The skirt 60 above the gaps may have a skirt thickness 68 of about one-quarter (¼) inch (e.g., 6.35 mm) to one and one-quarter (1¼) inches (e.g., 31.75 mm).

Similarly, each leg in the plurality of legs 62 may have a leg width 66 (see FIG. 4) that is between three quarters (¾) inch (e.g., 19.05 mm) and one and one-quarter (1¼) inches (31.75 mm). In some embodiments, each leg in the plurality of legs 62 may have a same radial width as the radial space width 71 between the legs. For example, in an embodiment of the colander 10 having six equally spaced and equally sized legs, each leg in the plurality of legs may span an angle of 30° as well as the radial space width 71 of the spaces. This arrangement may provide equal space for draining of fluids as width of legs for stabilization.

In some embodiments, the bowl height 76 from the top surface edge 26 to the upper ring top edge 49 may be about four and two-thirds (4⅔) inches (e.g., 118.533 mm). The corresponding upper ring diameter 52 of some embodiments having such a bowl height 76 may be about eleven (11) inches. An embodiment having a bowl height 76 of four and two-thirds (4⅔) inches may have legs with a leg height 64 of about one (1) inch and a total support structure height 78 of about two and one-third (2⅓) inches (e.g., 59.266 mm). In various embodiments of a larger or smaller colander, all stated possible dimensions may be altered while keeping the relative dimensions in proportion to each other. For example, if the bowl height 76 is nine and one-third (9⅓) inches (e.g., 237.066 mm), a corresponding upper ring diameter 52 may be twenty-two (22) inches (e.g., 558.8 mm).

It is important to note that the construction and arrangement of the various example embodiments described herein are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the positions of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present disclosure.

As utilized herein, the term "substantially" and similar terms are intended to have a broad meaning in harmony with the common and accepted usage by those of ordinary skill in the art to which the subject matter of this disclosure pertains. The terms should be interpreted as indication that insubstantial or inconsequential modifications or alterations of the subject matter described and claimed (e.g., within plus or minus five percent of a given angle and one-quarter (¼) of an inch (e.g., 6.35 mm) of a given measurement or value) are considered to be within the scope of the disclosure as recited in the appended claims. The terms "about" and "approximately" when used with respect to the values means plus or minus one-quarter (¼) of an inch (e.g., 6.35 mm) of the associated value or plus or minus five percent of the given angle. Further, example apparatuses are described herein. It should be understood that the words "example and "exemplary" are used herein to mean "serving as an example, instance, or illustration." Any embodiment or feature described herein as being an "example" or "exemplary" is not necessarily to be construed as preferred or advantageous over other embodiments or features.

What is claimed is:

1. A colander comprising:
   a base having a top base surface and a bottom base surface, the top base surface and the bottom base surface being opposite each other, the base defining a vertical central axis perpendicular to a tangent plane of the top and/or bottom base surface, the vertical central axis intersecting a center of the top base surface and a center of the bottom base surface;
   a curved wall extending from the top base surface along a bottom wall edge in a direction away from the bottom base surface toward a top wall edge, the curved wall positioned between the center of the top base surface and a terminating top surface edge of the top base surface, the curved wall encircling the vertical central axis to define an internal cavity having an inner diameter that is larger at an intermediate point along the curved wall between the bottom wall edge and the top wall edge than at either the bottom wall edge or the top wall edge, the curved wall having a plurality of openings positioned between the bottom wall edge and the top wall edge;
   an upper ring extending radially outward from the top wall edge to an upper ring terminating edge and vertically from the top wall edge to an upper ring top edge; and
   a support structure extending from the bottom base surface in a direction away from the top base surface.

2. The colander of claim 1, wherein the curved wall is parabolic in shape extending from the bottom wall edge to the top wall edge and defining a vertex therebetween, the parabolic curved wall having an upper curvature extending from the vertex to the top wall edge and a lower curvature extending from the vertex to the bottom wall edge.

3. The colander of claim 2, wherein a length of the lower curvature is greater than a length of the upper curvature.

4. The colander of claim 2, wherein a length of the upper curvature is greater than a length of the lower curvature.

5. The colander of claim 1, wherein the top base surface has a curvature extending from the terminating top surface edge toward the center of top base surface, and wherein a vertical height of the center of the top base surface is substantially greater than a vertical height of the terminating top surface edge.

6. The colander of claim 1, wherein the plurality of openings includes a bottom row of openings adjacent the bottom wall edge of the curved sidewall, wherein each opening in the bottom row of openings has a lower portion that is level with the top base surface.

7. The colander of claim 1, wherein the plurality of openings are in a staggered pattern such that each opening in the plurality of openings is horizontally staggered from openings that are vertically adjacent.

8. The colander of claim 1, wherein the terminating top surface edge contacts a terminating bottom surface edge of the bottom base surface, wherein the bottom base surface defines a first radius extending from the vertical central axis to the terminating bottom surface edge, wherein the support structure comprises a skirt extending from the bottom base surface toward a skirt end, the skirt extending generally vertically downward from the bottom base surface to the skirt end to define an angled skirt wall, the angled skirt wall defining a second radius extending from the vertical central axis to the intersection of the angled skirt wall and the skirt end, the first radius being larger than the second radius.

9. The colander of claim 8, wherein the curved wall defines a wall radius extending from the vertical central axis to the bottom wall edge, wherein the skirt at a location generally vertically lower than the bottom wall edge and within a distance of the wall radius from the vertical central axis is curved concavely as the skirt extends inward toward the vertical central axis, and wherein at the vertical central axis the skirt abuts the bottom base surface.

10. The colander of claim 1, wherein the support structure comprises a plurality of legs, each leg of the plurality of legs extending from the bottom base surface at a first radial distance from the vertical central axis toward a foot surface that is positioned at a second radial distance from the vertical central axis, wherein the second radial distance is greater than the first radial distance, and wherein each foot of each leg in the plurality of legs is radially spaced from each foot in each adjacent leg in the plurality of legs to define a gap facilitating fluid to travel therethrough.

\* \* \* \* \*